J. BRADY.
MACHINERY FOR STRETCHING LEATHER BELTING.

No. 191,920. Patented June 12, 1877.

UNITED STATES PATENT OFFICE.

JAMES BRADY, OF BROOKLYN, NEW YORK.

IMPROVEMENT IN MACHINERY FOR STRETCHING LEATHER BELTING.

Specification forming part of Letters Patent No. 191,920, dated June 12, 1877; application filed May 2, 1877.

*To all whom it may concern:*

Be it known that I, JAMES BRADY, of Brooklyn, in the county of Kings and State of New York, have invented an Improved Machine for Stretching Leather Belting; and I hereby declare that the following is a full, clear, and exact description of the same, reference being had to the accompanying drawing, forming part of this specification.

My invention supplies a much-desired means for permanently stretching leather belting, before using the same, in a much more thorough and uniform manner than has yet been accomplished.

When leather belting is stretched by longitudinal stress, in any apparatus for generating such stress, by pulling in opposite directions upon the ends of the belting, the belting permanently stretches almost wholly in its weaker parts, and the stronger parts, when the belt is subsequently used on pulleys, stretch still further, and the belt becomes slack.

In searching for the cause of such stretching on the pulleys, which takes place notwithstanding the longitudinal strain of the belt on the pulleys may be less than the belt has been subjected to in the previous stretching process, I have found that the stretching on the pulleys is caused principally by the alternate bending and straightening successively of all parts of the belts, respectively, at points which come in contact with and leave the surface of the pulleys when the belt is running. This alternate bending and straightening of the belt in its various parts acts to force the fibers of its texture over one another, and therefore acts to stretch the stronger parts of the belt as well as the weaker.

My invention applies the principle of flexion and reflexion in opposite directions to the stretching of belting before its use on pulleys to impel machinery, and it so uniformly and permanently stretches the belting in all its parts that when applied to permanent use the belts do not stretch nor become slack.

The invention consists in novel mechanism for effecting the stretching of belting by alternate flexion and reflexion while said belting is put under longitudinal tension, as hereinafter described.

Figure 1:
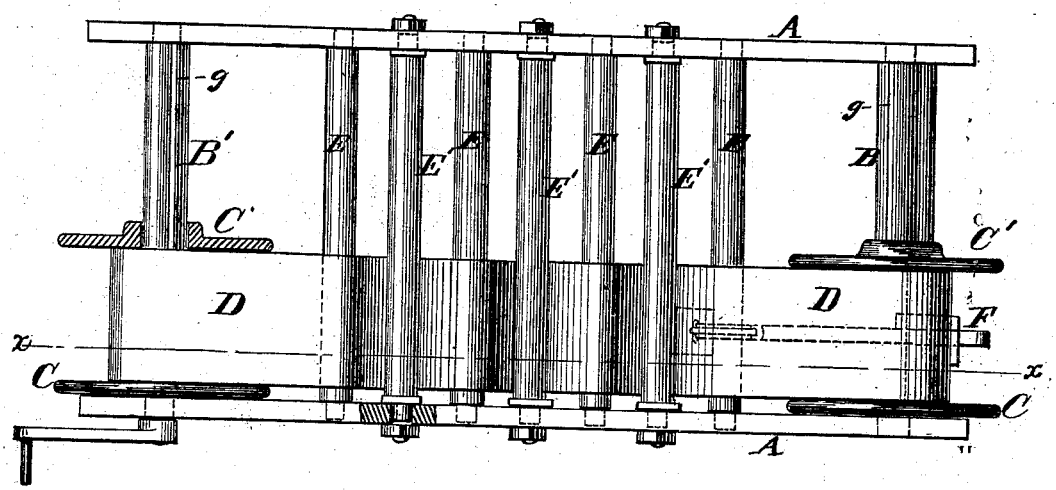
Figure 2:
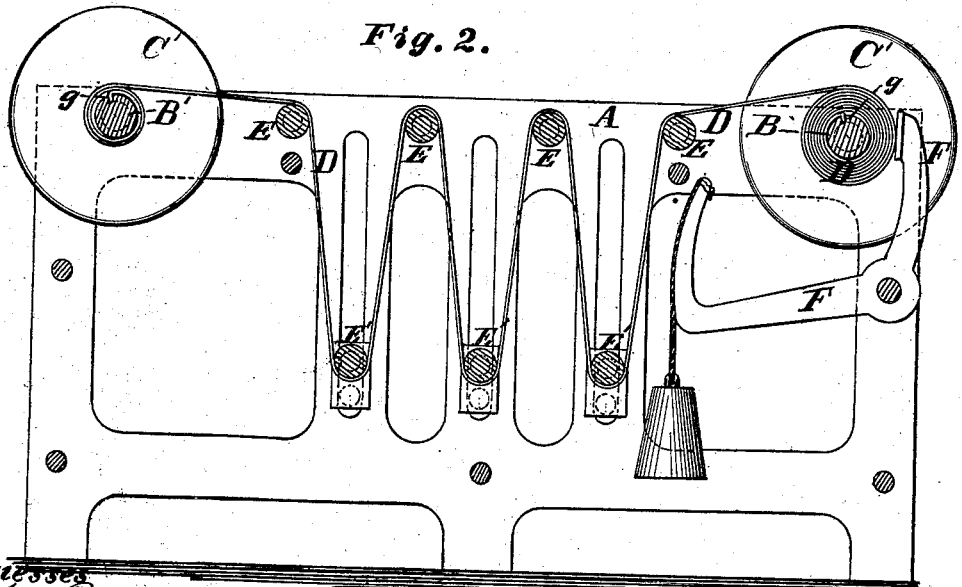

Figure 1 in the accompanying drawing is a top view of a machine for stretching belting constructed in accordance with my invention. Fig. 2 is a vertical section of the same on the line $x\ x$ in Fig. 1.

A is the frame of the machine, at opposite ends of which are, respectively, placed a delivery-roll, B, and a receiving-roll, B', the belting D to be stretched being wound first upon said delivery-roll, and afterward wound off from said delivery-roll and onto said receiving-roll during the process of stretching said belting.

Between said rolls are arranged in fixed bearings the flexion and reflexion rollers E. Other adjustable flexion and reflexion rollers, E', are also arranged in adjustable bearings in the frame A.

The delivery-roll B and the receiving-roll B' are each provided with a fixed flange or head, C, and an adjustable flange or head, C', which confine the belt laterally when undergoing the stretching process, and keep it straight, the adjustable flange C' being provided with a set-screw or other means for holding it in position.

Means for attaching the ends of the belting, respectively, to said delivery and receiving rolls are also provided, a groove, $g$, in which the end of the belt is inserted and clamped by wedging or otherwise, being advantageously employed for this purpose.

The said flexion and reflexion rollers E and E' are placed in parallel relation with each other and the rolls B and B'; but I do not limit myself to any particular number or position of said rollers between the rolls B and B'.

To the frame A is pivoted the weighted lever-brake F, which, in use, bears against the coil of belting wound on the delivery-roll B; but I do not limit myself to a weighted lever-brake, nor to any particular construction of the brake.

By causing the brake to bear against the coil of belting I oppose its frictional resistance to a constantly-diminishing radius, and the leverage of said resistance is decreased exactly as the leverage of the belting upon the delivery-roll is decreased, making constant the tension under which the belting is wound off from the said delivery-roll. But the brake may be otherwise constructed and applied to give the required constant tension to the belting.

The adjustability of the flexion and reflexion rolls E' adapts the machine to stretching long or short belts.

The belting D to be stretched is first attached to and wound upon the delivery-roll B, and the brake F is applied thereto. The free end of the belting is then passed alternately over the several flexion and reflexion rollers E, and under the adjustable flexion and reflexion rollers E', and attached to the receiving-roll B'. Power is then applied to the turning of the said receiving-roll, to wind the belting upon said roll and unwind it from the delivery-roll. In passing from the delivery-roll to the receiving-roll all parts of the belting are subjected to alternate and repeated flexion and reflexion while under longitudinal strain, and the thorough permanent stretching of the thicker as well as the thinner parts of the belting is effected.

I claim—

The combination of the delivery-roll B, the receiving-roll B', the flexion and reflexion rollers E E', and the brake F, substantially as and for the purpose described.

JAMES BRADY.

Witnesses:
FRED. HAYNES,
EDWARD B. SPERRY.